(12) United States Patent
Sallee et al.

(10) Patent No.: US 7,261,010 B2
(45) Date of Patent: Aug. 28, 2007

(54) ADJUSTABLE TEMPERATURE CORRECTION DEVICE

(75) Inventors: Richard A. Sallee, Houston, TX (US); Hooshang A. Befrui, Houston, TX (US)

(73) Assignee: Dresser, Inc., Addison, TX (US)

( * ) Notice: Subject to any disclaimer, the term of this patent is extended or adjusted under 35 U.S.C. 154(b) by 480 days.

(21) Appl. No.: 11/028,828

(22) Filed: Jan. 4, 2005

(65) Prior Publication Data

US 2006/0146912 A1   Jul. 6, 2006

(51) Int. Cl.
*G01D 21/00* (2006.01)

(52) U.S. Cl. .................................... 73/866.5

(58) Field of Classification Search ........... 73/866.5, 73/861.65, 861.67; 166/67, 69, 22
See application file for complete search history.

(56) References Cited

U.S. PATENT DOCUMENTS 5,193,912 A * 3/1993 Saunders .................... 374/179
5,973,267 A * 10/1999 Huang .................... 174/102 R
6,007,239 A * 12/1999 Nickol ........................ 374/1
6,523,427 B1 * 2/2003 Ferguson .................. 73/866.5

* cited by examiner

*Primary Examiner*—Jewel Thompson
(74) *Attorney, Agent, or Firm*—Fish & Richardson P.C.

(57) ABSTRACT

A temperature correction device may allow ready calibration. In certain implementations, a temperature correction device may include a torsion transmission element and a temperature responsive element. The temperature responsive element may be coupled to the torsion transmission element and adapted to rotate the torsion transmission element in response to sensed temperature changes. The temperature correction device may also include a first body coupled to the torsion transmission element, a second body coupled to the temperature responsive element, and a third body rotatably coupled to the second body. The first body may include a temperature correction component driven by the torsion transmission element, and the second body and the third body may be adapted to allow the torsion transmission element to rotate relatively freely with respect to the second body and the third body. Rotation of the second body relative to the third body may adjust the temperature correction component.

24 Claims, 4 Drawing Sheets

ADJUSTABLE TEMPERATURE CORRECTION DEVICE

TECHNICAL FIELD

This disclosure relates to process measurement and, more particularly, to temperature correction.

BACKGROUND

Temperature correction devices and techniques are used in a wide variety of environments for commercial and industrial applications. For example, temperature correction devices and techniques may be used for correcting for the temperature of fluids (gas and/or liquid) in pipelines or storage facilities. Many volumetric gas flow meters, for instance, require temperature correction to properly register the amount of gas passing therethrough. Such devices may use mechanical or electrical techniques to perform the temperature correction.

Common temperature correction devices and techniques use resistive thermocouples, resistive temperature devices, gas-filled Bourdon tubes, or bimetal coils to sense temperature. Bimetal coils have found favor because they may be readily manufactured at low cost, have good accuracy, and have long-term stability.

Bimetal coil temperature measurement devices include a bimetal coil that torsionally responds to temperature changes. A shaft is commonly disposed through the center of the coil and coupled to the coil at one end. The shaft is also commonly coupled to an indicator assembly. In operation, when the coil responds to a temperature change, the torsion is relayed to the shaft, causing it to rotate. The rotation of the shaft is then relayed to the indicator assembly, which produces an indication of the temperature sensed by the coil. Thus, a technician may read the temperature at the device.

When calibrating a temperature measurement device that uses a bimetal coil for measurement of natural gas, the device is commonly inserted into a bath at 60° F., which is the standard base temperature for natural gas. If the device does not indicate 60° F., the device is extracted from the bath and either portions of the coil are welded together or portions of the coil are welded to other components of the device. The device is then inserted into the bath again and checked for proper indication. This process of checking for proper indication and welding together of components to compensate for inaccuracy may be continued over several cycles.

SUMMARY

This disclosure describes temperature correction devices and techniques that may be readily adjusted. In one general aspect, a temperature correction device for fluid flowing through a meter may include a torsion transmission element, a temperature responsive element, a first body, a second body, and a third body. The temperature responsive element may be coupled to the torsion transmission element and adapted to rotate the torsion transmission element in response to sensed temperature changes at the temperature responsive element. In particular implementations, the torsion transmission element may include a shaft, and the temperature responsive element may include a bimetal coil. The first body may be coupled to the torsion transmission element and include a temperature correction component, which may be driven by the torsion transmission element. The second body may be coupled to the temperature responsive element and adapted to allow the torsion transmission element to rotate relatively freely with respect to the second body. The third body may be rotatably coupled to the second body and adapted to allow the torsion transmission element to rotate relatively freely with respect to the third body. Rotation of the second body relative to the third body may adjust the temperature correction component.

In certain implementations, the third body may include an indicator, and the first body may include a temperature indicia portion. The temperature indicia portion may be operable to move relative to the third body to provide an indication of sensed temperature. The third body may also be adapted to coupled to a meter index.

The second body and the third body may be composed of a thermoplastic polymer. In certain implementations, the second body may include a molded portion of a bearing for allowing the torsion transmission element to rotate relatively freely with respect to the second body. The second body may also include a fitting to allow for coupling to the second body.

The third body may be adapted to axially secure the second body. In particular implementations, the second body may include a coupling member for rotatably coupling to the third body. The coupling member may, for example, include a collar, and the third body may include axial projections that axially secure the collar.

In certain implementations, the device may include a resilient compressible element disposed between the second body and the third body. The resilient compressible element may provide resistance to rotation of the second body relative to the third body. The compressive spring element may, for example, be an O ring.

In another general aspect, a process for calibrating a temperature correction device for fluid flowing through a meter may include providing a temperature correction device including a temperature responsive element operable to rotate a torsion transmission element in response to sensed temperature changes, a first body coupled to the temperature responsive element, a second body rotatably coupled to the first body, and a third body including a temperature correction component driven by the torsion transmission element. The process may also include exposing the device to a known temperature environment and adjusting the first body so that the device indicates the temperature of the environment. Adjusting the first body may, for example, include rotating the first body relative to the second body.

The process may include allowing the device to adjust to the temperature environment. Also, the process may include determining whether the known temperature is indicated by the device.

The first body and the second body may fit around the torsion transmission element, and the torsion transmission element may rotate relatively freely with respect to the first body and the second body. The first body may also include a molded portion of a bearing for allowing the torsion transmission element to rotate relatively freely with respect to the first body, and the second body may include axial projections that axially secure the first body. A resilient compressible element may be disposed between the first body and the second body to provide resistance to rotation of the first body relative to the second body.

The second body may include an indicator, and the third body may include a temperature indicia portion operable to move relative to the second body to provide an indication of sensed temperature. Adjusting the first body so that the device indicates the temperature of the environment may include adjusting the first body so that the indicator indicates the environment temperature.

In a particular aspect, a temperature correction device for fluid flowing through a meter may include a shaft, a bimetal coil, a guide body, a mounting body, an O ring, and a temperature correction body. The bimetal coil may be coupled to the shaft and adapted to rotate the shaft in response to sensed temperature changes at the bimetal coil. The guide body may fit around the shaft and be coupled to the bimetal coil. The guide body may include a passage for receiving the shaft, a molded portion of a bearing in the passage for allowing the shaft to rotate relatively freely with respect to the guide body, a collar, and a fitting to allow for torsional coupling to the guide body. The guide body may be composed of a thermoplastic polymer. The mounting body may also fit around the shaft and be rotatably coupled to the guide body. The mounting body may be composed of a thermoplastic polymer and include a passage for receiving the shaft, a molded portion of a bearing in the passage for allowing the shaft to rotate relatively freely with respect to the mounting body, a mounting portion, a hub axially depending from the mounting portion, a plurality of axial projections depending from the mounting portion and adapted to axially secure the collar of the guide body, and a pointer. The O ring may be disposed between the mounting portion and the collar to provide resistance to rotation of the guide body relative to the mounting body. The temperature correction body may be coupled to the shaft and include a temperature correction component adjustable by rotation of the guide body and a temperature demarcated disc that moves relative to the pointer to provide an indication of sensed temperature.

Various implementations may have one or more features. For example, because a temperature correction component may be readily adjusted by rotation of another component, a temperature correction device may be readily calibrated, especially as opposed to having to alter the physical nature of a temperature responsive element or the relation between a temperature responsive element and another component. Furthermore, the calibration may be performed in one cycle, eliminating repeated calibration attempts. Thus, the temperature correction device may be calibrated with less effort and time. As another example, making one or more bodies out of a low thermal-coefficient thermoplastic polymer, provides a readily manufacturable temperature correction device that has a low thermal expansion, which increases accuracy. As an additional example, molding a portion of a bearing into one or more bodies may reduce the friction opposing the movement of a torsion transmission element, which also increases accuracy.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A temperature correction device that is readily adjustable may allow the temperature correction device to be efficiently calibrated. In particular implementations, adjustment may be achieved by a two-body assembly between a bimetallic coil and a temperature correction body. The components of the two-body assembly may be adjustable relative to each other, as well as to other components of the device to calibrate the temperature correction device. Other implementations, however, are possible.

Figure 1:
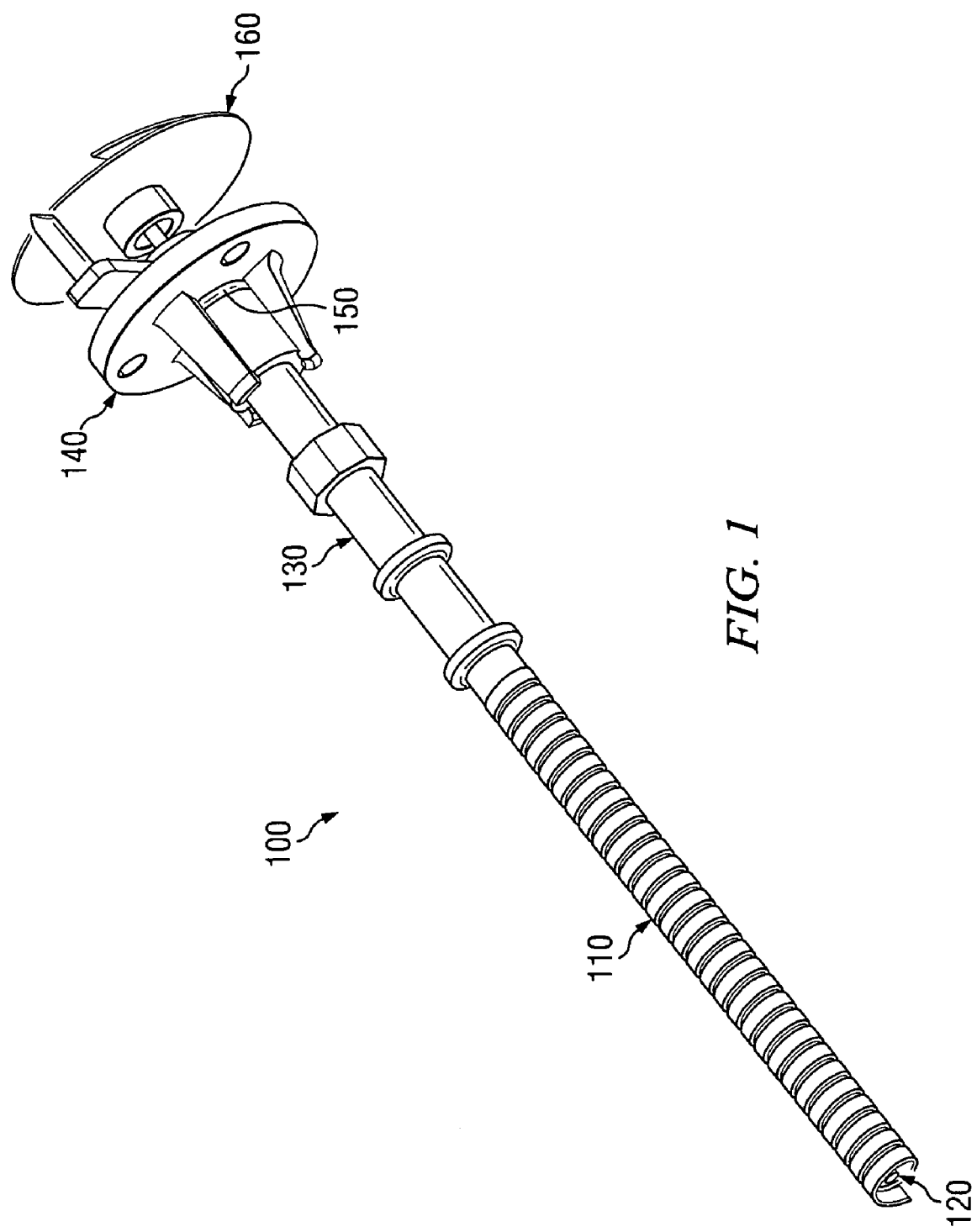
FIG. 1 is a line diagram illustrating one implementation of an adjustable temperature correction device.

FIG. 1 illustrates one implementation of an adjustable temperature correction device 100. Temperature correction device 100 includes a temperature responsive element 110, a torsion transmission element 120, a guide body 130, a mounting body 140, a resilient compressive element 150, and a temperature correction body 160. In operation, temperature responsive element 110 rotates torsion transmission element 120 in response to temperature changes at the temperature responsive element. The rotation is conveyed to temperature correction body 160, which rotates relative to mounting body 140 to indicate sensed temperature. Guide body 130 is rotationally coupled to mounting body 140 to allow the temperature correction device to be calibrated.

Figure 2:
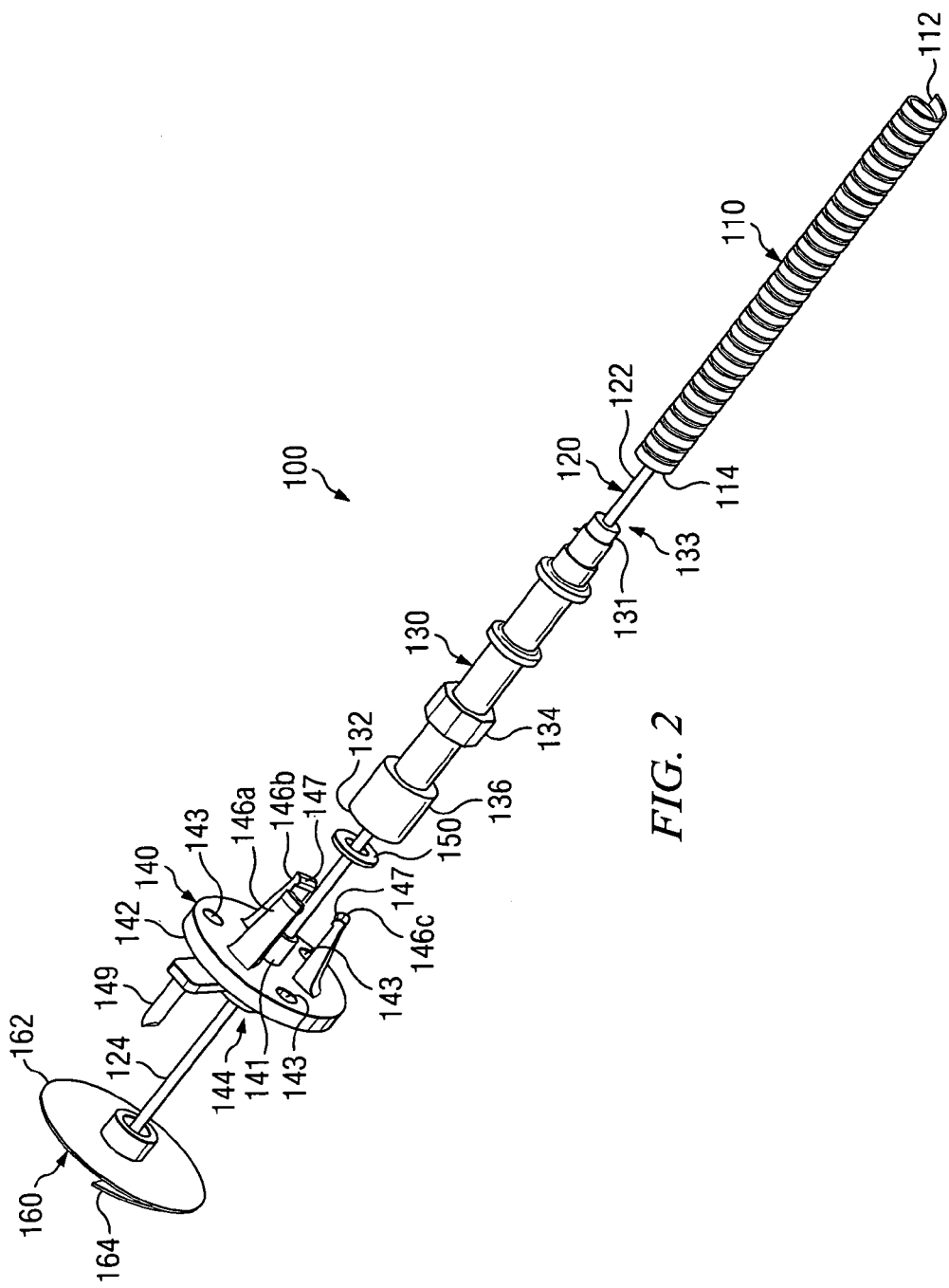
FIG. 2 is a line diagram illustrating an exploded view of the adjustable temperature correction device in FIG. 1.

FIG. 2 illustrates more detail regarding temperature correction device 100. As illustrated, temperature responsive element 110 is a bimetal coil having a first end 112 and a second end 114 in this implementation. The coil may, for example, be composed of 72% magnesium, 18% copper, and 10% nickel on the high-expansion side and 64% iron and 36% nickel on the low-expansion side. When exposed to a temperature change, element 110 coils in on itself or out away from itself, producing a clockwise or a counterclockwise rotation, respectively, when viewed from end 114. The response of the bimetal coil to temperature changes may be accurately predicted. In other implementations, temperature responsive element 110 may be any other appropriate device that produces predictable displacement in response to temperature changes, such as, for example, a helical, gas-filled Bourdon tube.

Torsion transmission element 120, in turn, is a shaft including a first end 122 and a second end 124 in this implementation. Torsion transmission element 120 is adapted to extend through temperature responsive element 110, and first end 122 is coupled (e.g., by welding) to first end 112 of temperature responsive element 110. Torsion transmission element 120 is also adapted to extend through guide body 130 and mounting body 140. Second end 124 is coupled (e.g., by welding or adhesion) to temperature correction body 160. In particular implementations, torsion transmission element 120 may conform to ASTM-276 condition B.

Guide body 130 includes a first end 131 and a second end 132 and a passage 133 between first end 131 and second end 132, through which torsion transmission element 120 extends. First end 131 is coupled to second end 114 of temperature responsive element 110. Guide body 130 may be coupled to temperature responsive element 110 by press fit (e.g., between intermeshing parts), adhesion, and/or any other appropriate technique. Press fit techniques include providing a prong on the guide body and a corresponding aperture in the temperature responsive element, providing a receptacle (e.g., a cup) on the temperature responsive element (e.g., by welding) to receive the guide body, providing a prong (e.g., an l-bend) on the temperature responsive element and an aperture in the guide body. Other appropriate techniques are also applicable.

Guide body 130 may be adapted to position temperature responsive element 120, and, hence, temperature correction device 100, with respect to a housing. Positioning the temperature responsive element may include aligning and orienting the temperature responsive element relative to the housing.

Guide body 130 also includes a fitting 134 to allow the guide body to be readily coupled to for rotational adjustment between guide body 130 and mounting body 140. In this implementation, fitting 134 is configured as a hexagonal element. Other appropriate configurations, however, may also be used. Guide body 130 additionally includes a coupling member 136. Coupling member 136 allows guide body 130 to be rotationally coupled to mounting body 140, as discussed in more detail below. As illustrated, coupling member 136 is a collar, but it may have any other appropriate configuration.

As mentioned previously, torsion transmission element 120 also extends through mounting body 140. Mounting body includes a hub 141, a mounting member 142, and a passage 144 therethrough, through which element 120 extends. Mounting body 140 also includes coupling members 146 and an indicator 149. Mounting member 142 is operable to couple mounting body 140, and, hence, temperature correction device 100, to a system that incorporates temperature correction device 100, such as, for example, a meter index of a volumetric fluid meter. In this implementation, mounting member 142 is a thin disc with apertures 143 therethrough to achieve the mounting. In other implementations, other appropriate configurations may be used. Hub 141 is located on one side of mounting member 142 and provides a platform for guide body 130 to rotate relative to mounting body 140 when coupled thereto. Coupling members 146 axially depend from mounting member 142 in this implementation and are adapted to spread apart to receive coupling member 136 of guide body 130 as the guide body is axially moved toward mounting member 142. Coupling members 146 includes detents 147 to axially secure coupling member 136 once it is within the coupling members. This coupling retards axial movement of guide body 130 relative to mounting body 140 but allows guide body to restrictively rotate relative to mounting body 140. Indicator 149 is a pointer in this implementation. Other appropriate coupling members and indicators may be used in other implementations.

In certain implementations, guide body 130 and mounting body 140 may be composed of a thermoplastic polymer. In particular, a thermoplastic polymer having a low coefficient of thermal expansion and good lubricity (i.e., a low coefficient of friction) may be used. A thermoplastic polymer including approximately 30% carbon, 15% Teflon™, and 10% fiberglass may meet these requirements. The carbon may provide enhanced strength to the thermoplastic polymer, and the Teflon™ may provide enhanced lubricity. In other implementations, the bodies may be composed of any other appropriate low thermal-expansion coefficient material, such as, for example, stainless steel 302 or stainless steel 304.

In particular implementations, the walls of passage 133 and/or passage 144 may have a portion of a bearing formed therein. This allows a bearing to be simulated without having to form the entire bearing in the passage(s), which simplifies manufacturing. In particular implementations, a jewel bearing may be simulated. Other types of appropriate bearings, however, may also be simulated.

Resilient compressible element 150 provides resistance to the rotation of guide body 130 to relative to mounting body 140. However, resilient compressible element 150 may allow guide body 130 to be rotated relative to mounting body 140 when an appreciable torque is applied (e.g., >2 lb-in.). Thus, resilient compressible element 150 restrictively allows guide body 130 to rotate relative to mounting body 140. Resilient compressible element 150 may also seal guide body 130 to mounting body 140.

In this implementation, resilient compressible element 150 is an O ring. In other implementations, however, it may be a gasket, a spring washer, a spring, or any other appropriate device that may be compressed and provide a restorative force.

In particular implementations, resilient compressible element 150 is larger than a gap between mounting member 142 and coupling member 136. For example, the gap may be approximately 0.04 inches, and resilient compressible element 150 may be a ring with a thickness of approximately 0.07 inches. Thus, the resilient compressible element will be placed into compression when guide body 130 is mated with mounting body 140. Also, coupling members 146 will be placed into tension. In certain implementations, resilient compressible element 150 may be coupled to or integral with guide body 130 or mounting body 140.

Temperature correction body 160 couples to torsion transmission element 120 and includes a temperature indicia component 162 that rotates in response to the rotation of element 120. Temperature correction body 160 also includes a temperature correction component 164 that rotates in response to the rotation of element 120.

In this implementation, temperature indicia component 162 is a thin disc. In other implementations, temperature indicia component 162 may have any other appropriate configuration. Temperature indicia component 162 may rotate through any appropriate angle (e.g., 300°) and contain any appropriate temperature indicia (e.g., numeric demarcations). In particular implementations, temperature indicia component 162 may display temperature values in the range of −20° F. to 120° F. Temperature correction component 164, in turn, is a spiral cam, although it may have any other appropriate configuration in other implementations. The rotational position of temperature correction component 164 affects the cam length presented to another component and, for example, may control the travel of a metering component. Thus, temperature correction component 164 may affect fluid meter output. In particular implementations, for instance, the rotational position of the temperature correction body controls the length of travel back of a computer arm on a metering clutch. Temperature correction body 160 may include any appropriate mechanisms (e.g., cams, gears, hubs, bearings, and shafts) to achieve the rotation of temperature indicia component 162 and/or temperature correction component 164.

In operation, temperature responsive element 110 rotates torsion transmission element 120 in response to temperature changes at the temperature responsive element. The rotation is conveyed through guide body 130 and mounting body 140 to temperature correction body 160, which rotates relative to mounting body 140 to indicate sensed temperature and to provide temperature correction.

To calibrate temperature correction device 100, at least temperature responsive element 110 is exposed (e.g., immersed) to a known temperature environment (e.g., a bath). The temperature correction device is allowed to adjust to the environment, and guide body 130 is seized at fitting 134. Guide body 130 is then rotated relative to mounting body 140. This rotation causes temperature correction component 164 of temperature correction body 160 to rotate. The rotation of temperature correction component 164 may continue until the temperature correction body indicates the temperature of the environment. The temperature correction device may be recalibrated through a similar technique at later times.

Temperature correction device 100 may have a variety of features. For example, because guide body 130 may be readily moved relative to mounting body 140, the temperature correction device may be efficiently calibrated, especially as opposed to having to alter the physical nature of temperature responsive element 110 or the relation between temperature responsive element 110 and guide body 130 (e.g., by welding). Furthermore, the calibration may be performed in one cycle, eliminating repeated calibration attempts. Thus, the temperature correction device may be calibrated with less effort and time.

Making the guide body and/or the mounting body out of a low thermal-coefficient thermoplastic polymer, provides a readily manufacturable temperature correction device that has low thermal expansion, which increases accuracy. The use of injection-molded materials in temperature correction devices has not previously been pursued for a variety of reasons, for example, poor temperature stability, lubricity, and ability to connect to metallic components (e.g., the temperature responsive element).

As a further example, molding a portion of a bearing into guide body 130 and/or mounting body 140 reduces the friction opposing the movement of torsion transmission element 120, which increases accuracy. As an additional example, the guide body and the mounting body may be used with various temperature correction bodies.

Figure 3:
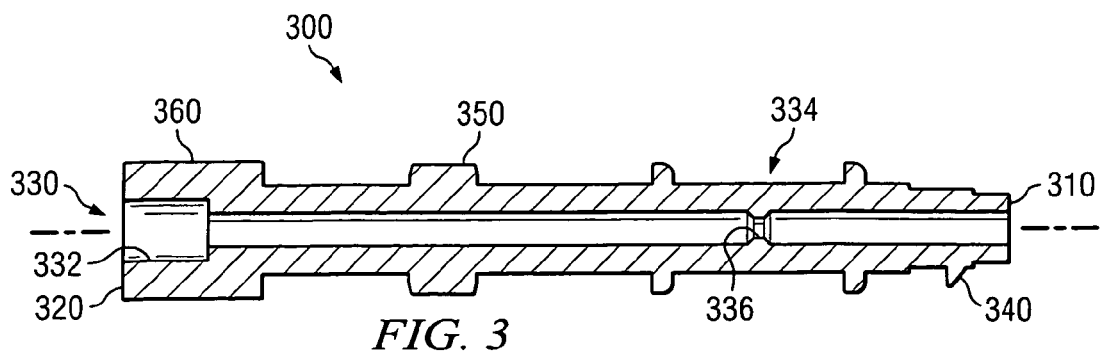
FIG. 3 is a line diagram illustrating a cross-sectional view of a first body for the adjustable temperature correction device in FIG. 1.

FIG. 3 illustrates one implementation of a guide body 300. Guide body 300 is one example of a guide body that may be used with temperature correction device 100 in FIG. 1. Guide body 300 may be formed as an integral component or a combination of components.

Guide body 300 includes a first end 310 and a second end 320. Between first end 310 and second end 320 extends a passage 330, in which a torsion transmission element may be received. Guide body 300 also includes a coupling element 340 (e.g., a detent) for coupling to a temperature responsive element. Guide body 300 may be coupled to a temperature responsive element by a press fit using coupling element 340 (e.g., between intermeshing parts). Guide body 300 also includes a fitting 350 to allow the guide body to be readily coupled to for rotational control. In particular, fitting 350 may be coupled to for rotational adjustment of a temperature correction body coupled to the guide body. Guide body 300 additionally includes a coupling member 360. Coupling member 360 allows guide body 300 to be rotationally coupled to a mounting body. As illustrated, coupling member 360 is a collar, but it may have any other appropriate configuration.

Passage 330 includes a wall 332. A section 334 of wall 332 forms a portion of a bearing 336. As illustrated, bearing portion 336 simulates a ring jewel bearing. Bearing portion 336 may be formed during a molding process for guide body 300. In other implementations, other bearings or portions thereof may be formed by wall 332.

Figure 4A:
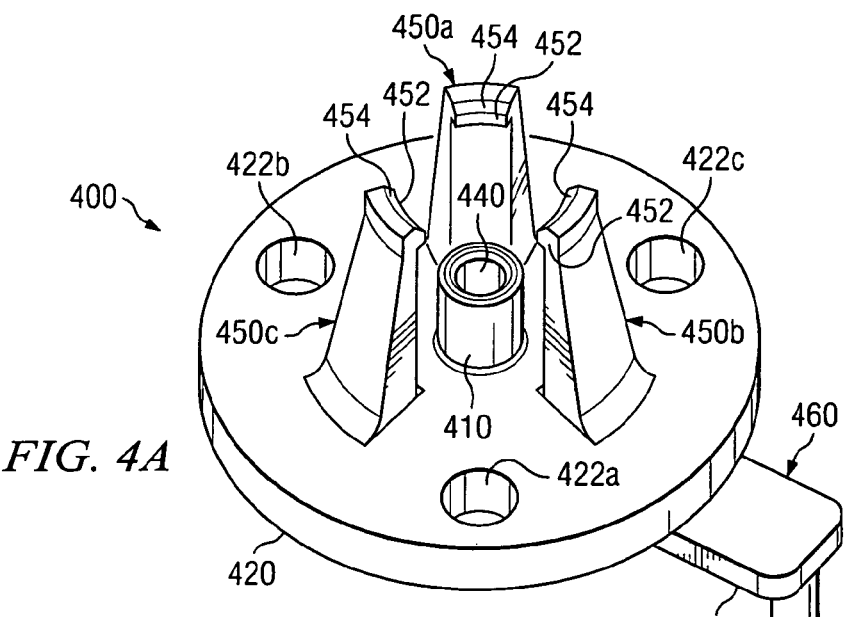
FIGS. 4A-B are line diagrams illustrating isometric views of a second body for the adjustable temperature correction device in FIG. 1.
Figure 4B:
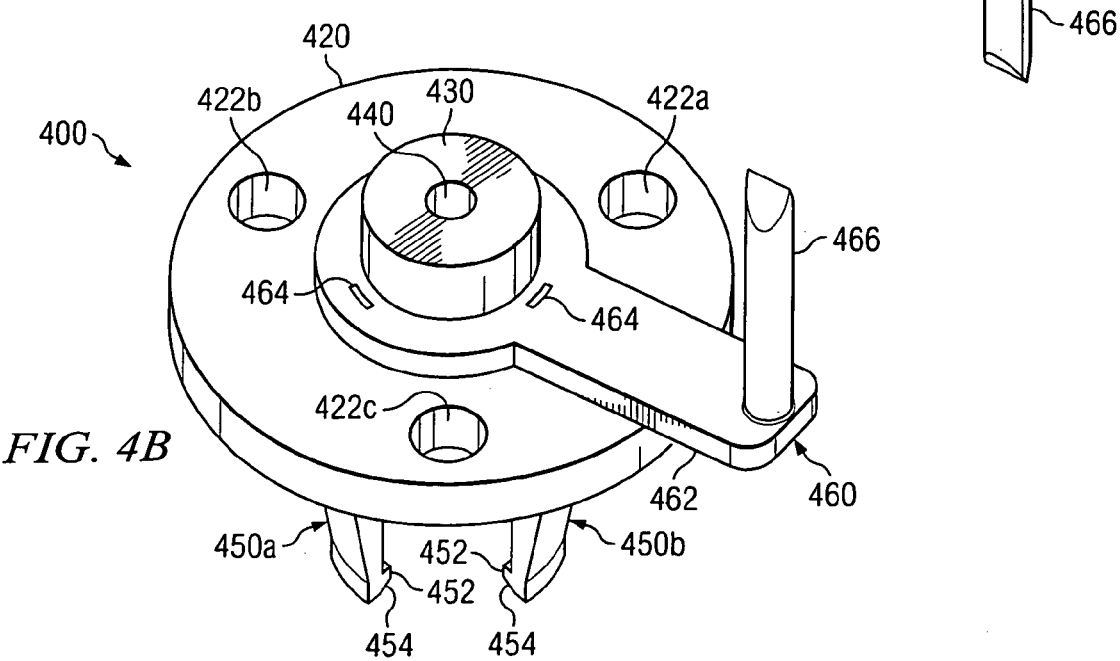

FIGS. 4A-B illustrate one implementation of a mounting body 400. Mounting body 400 is one example of a mounting body that may be used with temperature correction device 100 in FIG. 1.

Mounting body 400 includes a hub 410, a mounting member 420, and a hub 430. A passage 440, in which a torsion transmission element may be received, extends through the hubs and the mounting member. Mounting member 420 is operable to couple mounting body 400 to a system that incorporates a temperature correction device of which mounting body 400 is a part, such as, for example, a pressure measurement system, a temperature measurement system, or a flow measurement system. In this implementation, mounting member 420 is a disc with apertures 422 therethrough to achieve the mounting. Threaded fasteners, for example, may be inserted through apertures 422. Hub 410 is located on one side of mounting member 420 and provides a platform for a guide body to rotate relative to mounting body 400 when coupled thereto. Hub 430 is located on a second side of mounting member 420 and may provide alignment for a torsion transmission element and/or for rotation relative to a temperature correction body.

Mounting body 400 also includes coupling members 450 and an indicator assembly 460. Coupling members 450 are adapted to spread apart to receive a coupling member (e.g., a collar) of a guide body as a guide body is moved toward mounting member 420 and axially secure the guide body. In this implementation, coupling members 450 are tangs that extend from mounting member 420. Coupling members 450 include detents 452 (e.g., ledges) to axially secure a coupling member of a guide body once it is within the coupling members. This coupling retards movement of the guide body away from mounting body 400 but allows the guide body to restrictively rotate relative to mounting body 400. Coupling members 450 also include beveled surfaces 454. Beveled surfaces 454 facilitate the spreading apart of coupling members 450 to receive a guide body.

Indicator assembly 460 includes a support member 462 (e.g., an arm) and an indicator 466, which support member 462 is responsible for bearing. Indicator 466, illustrated here as a pointer, is responsible for indicating temperature on a temperature indicia portion of a neighboring temperature correction body.

Mounting body 400 may be formed as an integral unit or a combination of components. As illustrated, support member 462 includes slots 464, which assist in injection molding mounting body 400. In particular, slots 464 assist in making detents 452. Regardless of whether integral or a combination, one or more components of mounting body 400 may be formed by injection molding.

Figure 5:
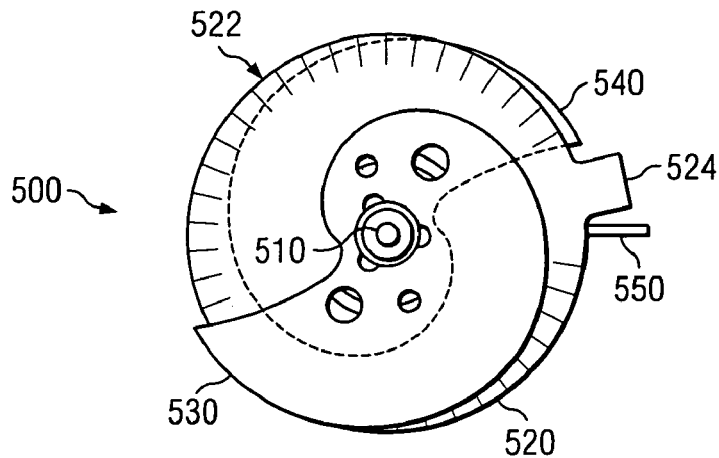
FIG. 5 is a line diagram illustrating a third body for the adjustable temperature correction device in FIG. 1.

FIG. 5 illustrates a temperature correction body 500. Temperature correction body 500 is one example of a temperature correction body that may be used with temperature correction device 100 in FIG. 1.

Temperature correction body 500 includes a hub 510, a dial 520, a working cam 530, and a balance cam 540. Dial 520 includes temperature indicia 522 and a detent 524, and dial 520, working cam 530, and balance cam 540 are coupled to hub 510 for rotation thereby. In this implementation, the radius of working cam 530 and balance cam 540 change with angular position about their centers. The cams may have other appropriate configurations in other implementations. Temperature indicia 522 of dial 520 facilitate temperature indication, and working cam 530 facilitates temperature correction. Balance cam 540 reduces rotational inertia imbalances caused by working cam 530.

In one mode of construction, hub 510 is coupled (e.g., by welding) to an end of a torsion transmission member. Dial 520 and balance cam 540 are coupled together (e.g., by riveting) to form a dial assembly. The dial assembly may be secured together with hub 510 and working cam 530 in a sandwich relation (e.g., by staking).

In operation, hub 510 is rotated by the torsion transmission member. This rotation moves dial 520 and, hence, temperature indicia 522 relative to an indicator 550, which may be part of a mounting body. Thus, temperature indicia 522 provide an indication of sensed temperature. Detent 524 prevents over rotation of dial 520, which may result in an incorrect indication of temperature and/or damage to a temperature responsive element. The rotation also moves working cam 530. The varying perimeter of working cam 530 also provides an indication of temperature. This may be accomplished by the perimeter affecting the travel of another meter component (e.g., a clutch arm).

Figure 6:
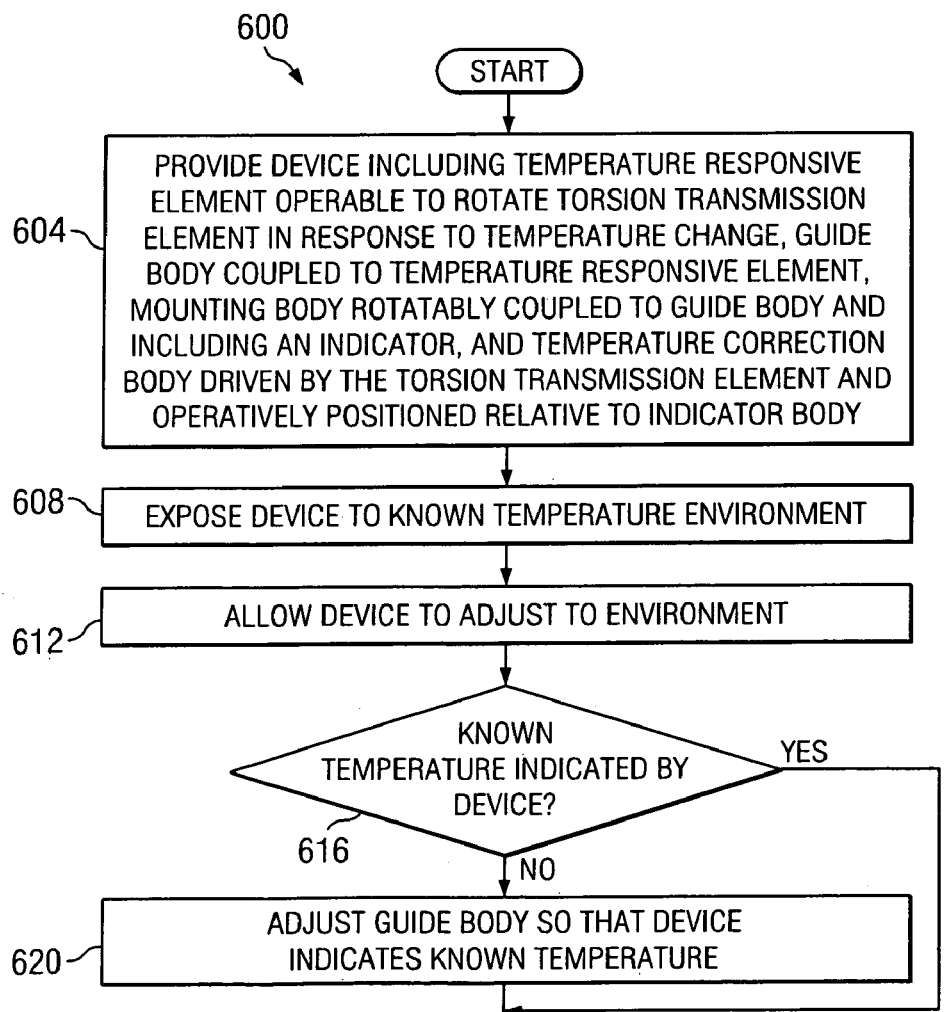
FIG. 6 is a block diagram illustrating a process for calibrating an adjustable temperature correction device.

FIG. 6 illustrates one implementation of a process 600 for calibrating a temperature correction device. Process 600 may, for example, illustrate the process for calibrating temperature correction device 100.

Process 600 begins with providing a temperature correction device including a temperature responsive element operable to rotate a torsion transmission element in response to a temperature change, a guide body coupled to the temperature responsive element, a mounting body rotatably coupled to the guide body and including an indicator, and a temperature correction body driven by the torsion transmission element and operatively positioned relative to the mounting body (operation 604). Providing the device may be accomplished by manufacturing the temperature correction device, by incorporating the guide body and the mounting body with a pre-existing temperature correction device, by obtaining (e.g., ordering) the temperature correction device, or by any other appropriate technique.

Process 600 continues with exposing the temperature correction device to an environment having a known temperature (operation 608). This environment may, for example, be a liquid bath having a temperature of 60° F., and the temperature correction device may be immersed therein.

Process 600 includes allowing the device to adjust to the environment (operation 612). This may include waiting for at least the reaction time of the temperature correction device or for the temperature correction body to stop moving.

Process 600 also includes determining whether the environment temperature is indicated by the temperature correction device (operation 616). This determination may, for example, be accomplished by a visual inspection. If the environment temperature is indicated by the temperature correction device, the process is at an end. If, however, the environment temperature is not indicated by the temperature correction device, the process calls for adjusting the guide body so that the environment temperature is indicated by the temperature correction device (operation 620). Adjusting the guide body may, for example, include seizing the guide body and rotating it relative to the mounting body. The temperature indication may be based on temperature indicia and/or the position of the temperature correction body.

Although FIG. 6 illustrates one implementation of a process for calibrating a temperature correction device, other implementations may include fewer, additional, and/or a different arrangement of operations. For example, a calibration process may include contemporaneously verifying the calibration or checking the calibration at a later time. As another example, a calibration process may not include determining whether the known temperature is indicated by the device. As an additional example, a calibration process may include coupling to the guide body.

A number of implementations have been described, and various other implementations have been mentioned or suggested. Additionally, a variety of additions, deletions, substitutions, and/or modifications to these implementations will be readily suggested to those skilled in the art while still achieving adjustable temperature correction. For these reasons, the invention is to be measured by the appended claims, which may encompass one or more of these implementations.

The invention claimed is:

1. A temperature correction device for fluid flowing through a meter, the device comprising:

a torsion transmission element;

a temperature responsive element coupled to the torsion transmission element, the temperature responsive element adapted to rotate the torsion transmission element in response to sensed temperature changes at the temperature responsive element;

a first body, the first body coupled to the torsion transmission element and comprising a temperature correction component, the temperature correction component driven by the torsion transmission element;

a second body, the second body coupled to the temperature responsive element and adapted to allow the torsion transmission element to rotate relatively freely with respect to the second body; and a third body, the third body rotatably coupled to the second body and adapted to allow the torsion transmission element to rotate relatively freely with respect to the third body, wherein rotation of the second body relative to the third body adjusts the temperature correction component.

2. The device of claim 1, wherein the torsion transmission element comprises a shaft.

3. The device of claim 1, wherein the temperature responsive element comprises a bimetal coil.

4. The device of claim 1, wherein the second body and the third body comprise a thermoplastic polymer.

5. The device of claim 4, wherein the second body comprises a molded portion of a bearing for allowing the torsion transmission element to rotate relatively freely with respect to the second body.

6. The device of claim 1, wherein the second body comprises a fitting to allow for coupling to the second body.

7. The device of claim 1, wherein the third body is adapted to axially secure the second body.

8. The device of claim 7, wherein the second body comprises a coupling member for rotatably coupling to the third body.

9. The device of claim 8, wherein:

the coupling member comprises a collar; and the third body comprises axial projections that axially secure the collar.

10. The device of claim 1, wherein:

the third body comprises an indicator; and the first body comprises a temperature indicia portion operable to move relative to the third body to provide an indication of sensed temperature.

11. The device of claim 1, further comprising a resilient compressible element disposed between the second body and the third body, the resilient compressible element providing resistance to rotation of the second body relative to the third body.

12. The device of claim 11, wherein the resilient compressible element comprises an O ring.

13. The device of claim 1, wherein the third body is adapted to couple to a meter index.

14. A method for adjusting a temperature correction device for fluid flowing through a meter, the method comprising:
providing a temperature correction device comprising a temperature responsive element operable to rotate a torsion transmission element in response to sensed temperature changes, a first body coupled to the temperature responsive element, a second body rotatably coupled to the first body, and a third body comprising a temperature correction component driven by the torsion transmission element;
exposing the device to a known temperature environment; and
adjusting the first body so that the device indicates the temperature of the environment.

15. The method of claim 14, further comprising allowing the device to adjust to the temperature environment.

16. The method of claim 14, wherein adjusting the first body comprises rotating the first body relative to the second body.

17. The method of claim 14, wherein:
the second body comprises an indicator; and
the third body comprises a temperature indicia portion operable to move relative to the second body to provide an indication of sensed temperature.

18. The method of claim 17, wherein adjusting the first body so that the device indicates the temperature of the environment comprises adjusting the first body so that the indicator indicates the environment temperature.

19. The method of claim 14, further comprising determining whether the known temperature is indicated by the device.

20. The method of claim 14, wherein:
the first body fits around the torsion transmission element and the torsion transmission element rotates relatively freely with respect to the first body; and
the second body fits around the torsion transmission element and the torsion transmission element rotates relatively freely with respect to the second body.

21. The method of claim 14, wherein the first body comprises a molded portion of a bearing for allowing the torsion transmission element to rotate relatively freely with respect to the first body.

22. The method of claim 14, wherein the second body comprises axial projections that axially secure the first body.

23. The method of claim 14, wherein the device further comprises a resilient compressible element disposed between the first body and the second body, the resilient compressible element providing resistance to rotation of the first body relative to the second body.

24. A temperature correction device for fluid flowing through a meter, the device comprising:
a shaft;
a bimetal coil coupled to the shaft and adapted to rotate the shaft in response to sensed temperature changes at the bimetal coil;
a guide body fitting around the shaft and coupled to the bimetal coil, the guide body composed of a thermoplastic polymer and comprising:
a passage for receiving the shaft,
a molded portion of a bearing in the passage for allowing the shaft to rotate relatively freely with respect to the guide body,
a collar, and
a fitting to allow for torsional coupling to the guide body;
a mounting body fitting around the shaft and rotatably coupled to the guide body, the mounting body composed of a thermoplastic polymer and comprising:
a passage for receiving the shaft,
a molded portion of a bearing in the passage for allowing the shaft to rotate relatively freely with respect to the mounting body,
a mounting portion,
a hub axially depending from the mounting portion,
a plurality of axial projections depending from the mounting portion and adapted to axially secure the collar of the guide body, and
a pointer;
an O ring disposed between the mounting portion and the collar to provide resistance to rotation of the guide body relative to the mounting body; and
a temperature correction body coupled to the shaft, the temperature correction body comprising a temperature correction component adjustable by rotation of the guide body and a temperature demarcated disc that moves relative to the pointer to provide an indication of sensed temperature.

* * * * *